United States Patent [19]
De Beijer et al.

[11] Patent Number: 5,440,899
[45] Date of Patent: Aug. 15, 1995

[54] HEAT ACCUMULATOR, METHOD FOR THE PRODUCTION THEREOF AND ENERGY SYSTEM PROVIDED WITH SUCH A HEAT ACCUMULATOR

[75] Inventors: Hendrikus A. De Beijer, Huissen; Jan W. Klein Horsman, Arnhem, both of Netherlands

[73] Assignee: De Beijer Raadgevend Technisch Bureau B.V., Arnhem, Netherlands

[21] Appl. No.: 244,750

[22] PCT Filed: Dec. 11, 1992

[86] PCT No.: PCT/NL92/00225

§ 371 Date: Jun. 13, 1994

§ 102(e) Date: Jun. 13, 1994

[87] PCT Pub. No.: WO93/12394

PCT Pub. Date: Jun. 24, 1993

[30] Foreign Application Priority Data

Dec. 11, 1991 [NL] Netherlands ............ 9102072

[51] Int. Cl.⁶ ............................................. F25B 17/08
[52] U.S. Cl. ............................. 62/480; 165/104.12
[58] Field of Search .............. 62/480, 479, 478, 477; 165/104.12, 10

[56] References Cited

U.S. PATENT DOCUMENTS

| | | | |
|---|---|---|---|
| 1,881,208 | 10/1932 | Masterman | 62/480 |
| 2,019,356 | 5/1931 | Normelli | 62/480 |
| 2,649,700 | 8/1953 | Piper . | |
| 4,135,371 | 1/1979 | Kesselring et al. | 165/104.12 X |
| 4,169,362 | 10/1979 | Weil et al. . | |
| 4,186,794 | 2/1980 | Brunberg et al. | 62/478 X |
| 4,205,531 | 6/1980 | Brunberg et al. | 62/477 X |
| 4,421,156 | 12/1983 | Vaubel et al. | 165/104.12 X |
| 4,759,191 | 7/1988 | Thomas et al. | 62/480 X |
| 5,088,548 | 2/1992 | Lindner et al. | 165/10 |
| 5,120,694 | 6/1992 | Dunne et al. | 502/68 |
| 5,384,101 | 1/1995 | Rockenfeller | 62/408 X |

FOREIGN PATENT DOCUMENTS

2622699 11/1977 Germany .
7812120 6/1979 Netherlands .

*Primary Examiner*—John Rivell
*Assistant Examiner*—Christopher Atkinson
*Attorney, Agent, or Firm*—Young & Thompson

[57] ABSTRACT

The invention concerns a heat accumulator consisting of a vessel having a wall which is at least partially heat conducting, the vessel contains a material which exothermally absorbs and endothermally desorbs a heat transporting substance, the absorbing and desorbing material in particular being sodium sulphide and being adhered to the wall of the vessel by means of a fibrous material such as cellulose. Also provided is a process for the production of such a heat accumulator comprising, applying a fibrous material to the inner wall of a closeable vessel, preferably via conducting protrusions, and subsequently contacting the absorbing and desorbing material being in a molten and/or hydrated state with the fibrous material.

23 Claims, 4 Drawing Sheets

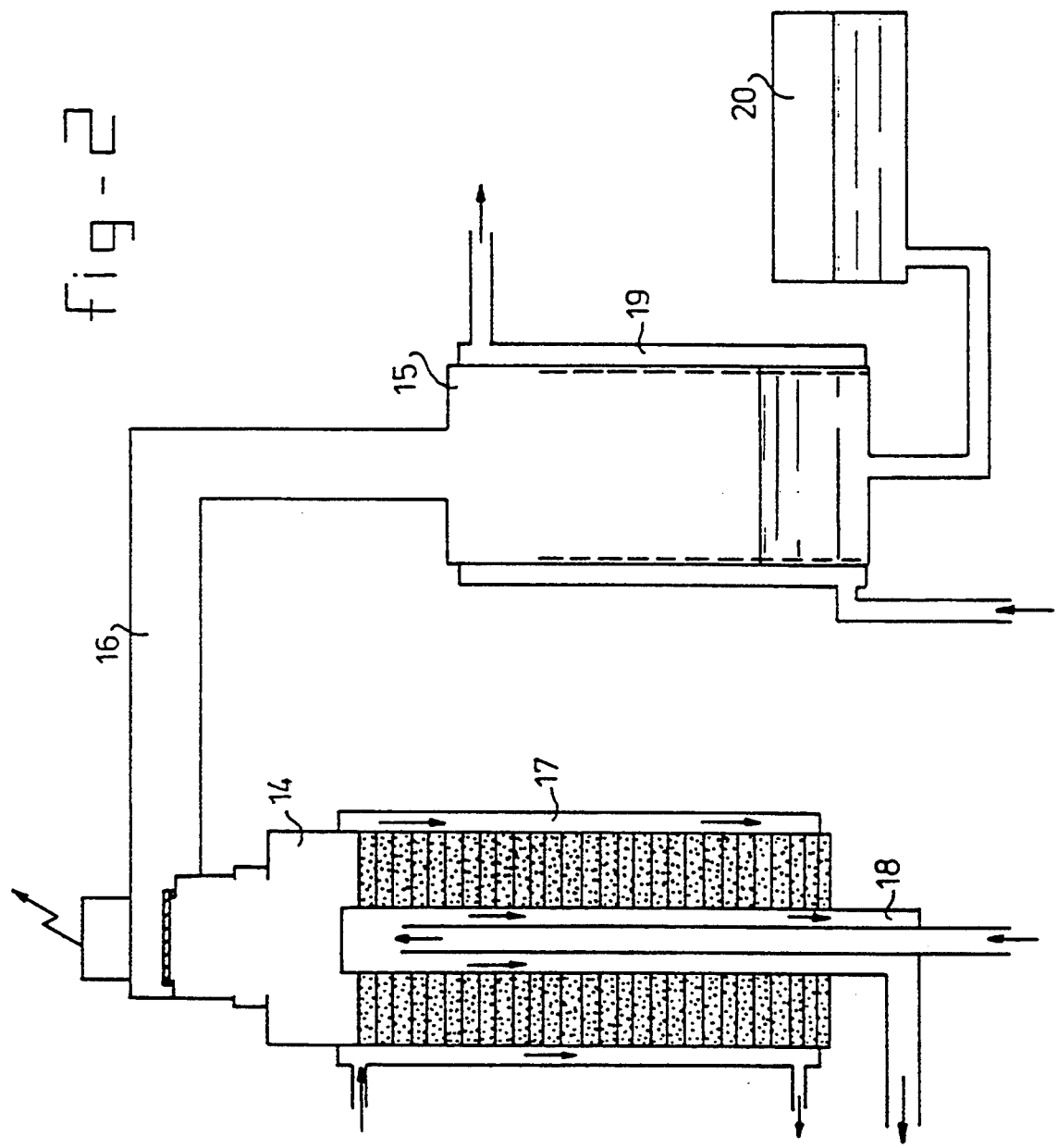

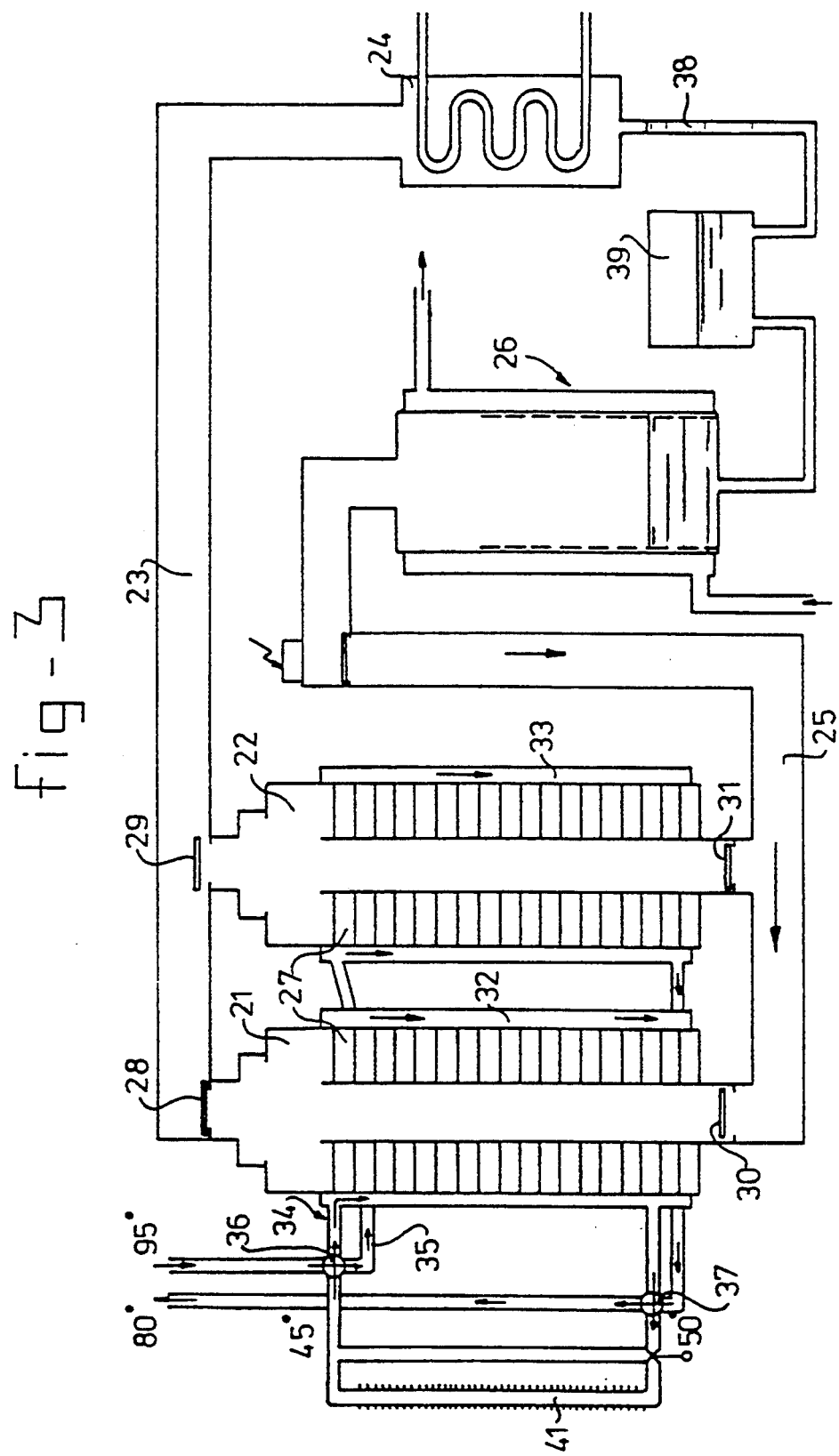

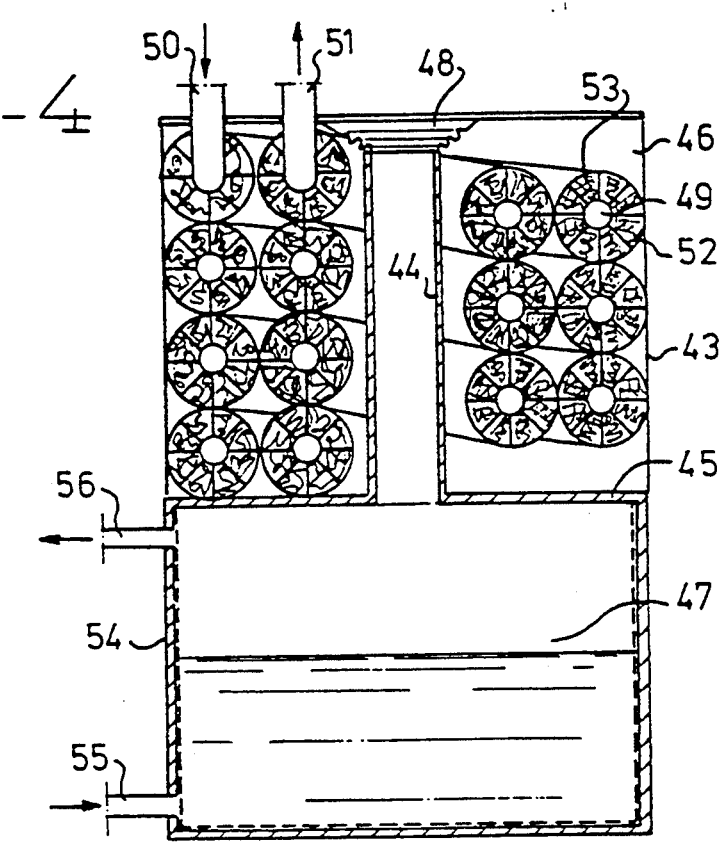
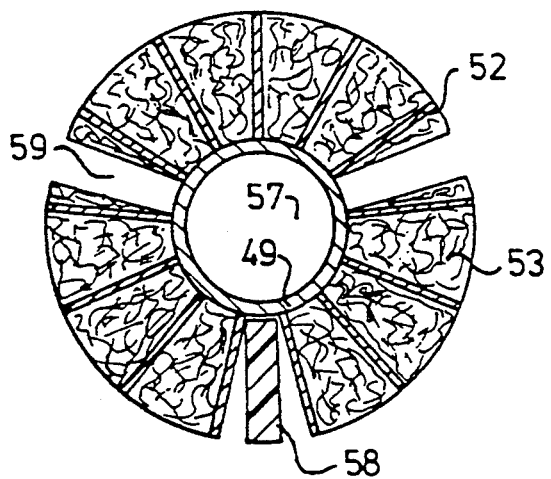

HEAT ACCUMULATOR, METHOD FOR THE PRODUCTION THEREOF AND ENERGY SYSTEM PROVIDED WITH SUCH A HEAT ACCUMULATOR

The invention relates to a chemical heat accumulator for the storage and/or release of heat, heat being stored or released in the form of chemical binding energy. A heat accumulator of this type consists of a vessel having a wall which is at least partially heat-conducting, which vessel contains a crystalline material which exothermally absorbs and endothermally desorbs a heat-transporting substance. When charging the accumulator, the heat-transporting substance (the sorbate) is vaporized from the absorbing and desorbing material. This vapour can condense in a condenser/vaporizer which is at a lower temperature than the accumulator. When discharging the accumulator the sorbate is vaporized in the condenser/vaporizer with absorption of heat and absorbed, at a higher temperature than that of the condenser/vaporizer, by the absorbing and desorbing material in the accumulator, with release of heat.

In the present description the term "heat accumulator" is used to denote only the vessel in which the absorption and desorption take place, while the combination with a vaporizer/condenser and any connecting lines, which can be used as a heat pump, is indicated by the term "energy system".

An energy system as indicated above has been disclosed in Netherlands Patent Application 7714490 and U.S. Pat. No. 4,186,794. In these publications calcium chloride and sodium sulphide are proposed as the absorbing and desorbing solid and water as the heat-transporting substance. A disadvantage of a system of this type is, however, that the solid is poured loosely, in the form of metal salt which may or may not be hydrated, round or in the heat exchanger and as a consequence of this the heat exchange between the absorbent/desorbent material and the heat exchanger is poor. A similar system is disclosed in European Patent Application 35871, aluminium compounds, which are poured into small containers, being used as absorbent/desorbent solid. This system also has the said disadvantage of poor heat transfer.

Attempts have been made to solve the problem of the poor heat exchange by increasing the heat-conducting power by using additives having a high thermal conductivity (European Patent Application 129473) or by using absorbent/desorbent solids which themselves have a high thermal conductivity, as in European Patent Application 35871. However, solutions of this type have not led to a heat exchange which is such that rapid charging and discharging of the energy system is possible. Another disadvantage of the known chemical heat accumulator system is the need to degas the system from time to time, which demands extra costs and provisions and temporarily removes the system from use.

DE-A-2622699 discloses a heat accumulator consisting of a vessel containing a sorption material without specific means for adhering the sorption material to the wall of the vessel.

Netherlands Patent Application 90.01289, which was not prepublished, describes a heat accumulator wherein the absorbent/desorbent material is a crystalline substance which adheres to the wall of the second vessel and remains adhering during use. Adhering is effected by applying the crystalline material in molten and/or highly hydrated state to the inner wall of a closeable vessel and cooling and/or evaporating so as to cause adhering to the wall.

However, the crystallization process cannot always be controlled, and thus it is difficult to determine the final structure of the crystalline material. It is also difficult to maintain this structure during long-term use. Moreover, the absorption rate and absorptive capacity of the heat-transporting substance can be improved.

A heat accumulator has now been found which does not have the said disadvantages and which allows short charging and discharging times and long life spans in an energy system.

The heat accumulator according to the invention is characterised in that the absorbing and desorbing material is adhered to the wall of the vessel by means of a fibrous material. A "wall" is understood herein to comprise any physical confinement of the vessel, including therefore the outer wall of a body contained in the vessel.

As a result of this characteristic, the manufacture of a heat accumulator is simplified and a stable structure is obtained wherein a rapid and effective absorption and desorption of heat-transporting substance (sorbate) takes place.

The fibrous material can be any material capable of absorbing liquids, in particular water, and which has a non-compact structure. Preferably, the fibrous material is cellulose or a cellulose derivative, whereby cellulose is understood as to comprise any natural or artificial cellulose-like material, such as material derived from wood, cotton and the like, modified cellulose and the like.

The use of cellulose in heat storage is known per se from Netherlands Patent Application 78.12120. An element consisting of a body of fibrous material such as paper or board, which is impregnated with a calcium chloride solution, is described therein. The element can be charged (heat storage) by drying and the stored heat can be released by blowing humid air through it. This element is not suitable, however, for use in closed systems, such as heat pumps, since heat transfer is insufficient for that purpose and a combination with a heat exchanger is not possible. Furthermore, such an element is not suitable for use as cold storage.

The material which acts as absorbent/desorbent solid can be a salt known for this purpose, such as a hygroscopic chloride, for example magnesium, calcium or lithium chloride. However, the absorbing and desorbing material is preferably sodium sulphide.

The heat-transporting substance can be water (vapour), as is customary. In the discharged state of the energy system, the absorbing and desorbing material is then in a relatively high hydration state, for example $Na_2S.5H_2O$, and in the charged state of the energy system it is in a low hydration state, for example $Na_2S.H_2O$ or $Na_2S.0.5H_2O$.

The heat-transporting substance can, however, also be another substance which can be present either in vapour form or in liquid form and can be incorporated in a crystal structure, for example an alcohol, an amine and in particular ammonia ($NH_3$). The use of ammonia is particularly preferred if heat exchange has to take place at relatively low temperatures.

The fibrous material can be applied directly to the inner wall of the heat accumulator in a desired thickness of, for example, a few mm to a few cm. Preferably, however, the fibrous material is present on surface-enlarging, heat-conducting projections at the wall, for example in the form of metal wires, hairs, spirals, ribs and the like. By this means the amount of absorbing and desorbing material per unit surface area can be increased, as a result of which the thermal capacity of the heat accumulator increases. The adhesion of the fibrous material is also improved by this means. As a result of the firm bonding of the material to the wall of the heat accumulator, it remains in place even when the accumulator is subjected to movements, shocks and vibrations.

The surface-enlarging structure is obtained by fixing wires or rods or fins made of the same material as the wall of the heat accumulator or of other material to the wall of the accumulator vessel. The fixing can be effected, for example, by hard or soft soldering, but it is also possible for the wall and the surface-enlarging structure to be formed or cast as a single unit. Materials having a good thermal conductivity are particularly suitable, for example copper or coated aluminium. The coating on the aluminium can consist of an impermeable layer, which may or may not be of metallic nature (for example electrolytically or chemically applied copper).

The heat accumulator according to the invention can be constructed in various ways. A particular form is that in which the vessel comprises two concentric tubes, the crystalline material being present in the space between the two tubes. This pipe-shaped heat accumulator is preferably set up vertically. The space between the two tubes is then closed at the bottom by a partition, which also serves to catch any material which may have broken loose.

In one variant of the pipe-shaped accumulator, the inner tube is provided with a valve which can be operated via a magnet located outside the vessel, the inner tube serving to supply and remove the heat-transporting substance. In another variant the inner tube is provided on the inside with a heat exchanger which is known per se.

If the heat accumulator consists of two concentric tubes, the surface-enlarging projections can be formed, for example, by a rectangularly wound metal wire. The width of the winding then corresponds to the distance between the inner and the outer tube, so that if the wound wire is fitted in spiral form through the space between the two tubes, the winding touches both the outer tube and the inner tube.

The heat accumulator is preferably provided with one or more heat exchangers for rapidly supplying and removing heat. The heat exchangers can be mounted on the outside of the vessel. Preferably, the absorbing and desorbing material is present in the part of the vessel which is in contact with the heat exchangers. The heat exchangers may also be positioned in the vessel, in which case the outer wall of the heat exchanger is part of the (inner) wall of the vessel. If the accumulator consists of two concentric tubes, the heat exchanger can be located as a spiral pipe in the space between the inner tube and the outer tube; the spiral pipe is preferably provided with surface-enlarging projections which hold the fibrous material.

The invention also relates to a method for the production of a heat accumulator which has the above-mentioned characteristics. According to this method, a fibrous material is applied on the inner wall of a closeable vessel and subsequently the absorbing and desorbing material in the molten and/or highly hydrated state is brought into contact with the fibrous material. The absorbing and desorbing material is thereby absorbed by the fibrous material in a sponge-like manner.

The fibrous material is preferably combined with an agent which improves heat conduction, such as graphite or silicon carbide. Optionally, such an agent can be applied together with the absorbing and desorbing material, but the heat-conducting material is preferably mixed with the fibrous material and applied together with the latter. The addition of graphite can—in addition to an improved heat conduction—improve the homogeneity of the structure and the stability of the layer of absorbing and desorbing material, and furthermore, the graphite can absorb possible traces of undesirable gases, such as oxygen.

The fibrous material can be brought into the vessel either in a dry state or in a humidified state. Wherever reference is made to cellulose herebelow, another fibrous can be involved as well, as explained above. If applied in a dry state, the cellulose can be brought into the vessel, optionally using a stream of air, or in the form of a powder or dust. If necessary, the fibrous material can be held in place by using a sleeve or gauze of cotton cellulose or another vapour-permeable material.

The fibrous material can also be applied in the vessel in a wet or moist state. It may then be brought in its intended place as a homogeneous paste or pulp, preferably mixed with graphite.

If sodium sulphide is used as the absorbing and desorbing material, it is introduced, for example in its maximum hydrated state, such as $Na_2S.9H_2O$, at elevated temperature into the vessel and sodium sulphide crystals are then formed by cooling, which crystals adhere to the wall of the vessel through the fibrous material. Sodium sulphide can also be absorbed in liquid form by the fibrous material, without crystals being necessary. Optionally, the steps of applying molten and/or hydrated crystalline material and cooling and crystallizing and/or absorbing can be repeated until the desired amount of sodium sulphide is applied. It is also possible in the interim to pour off the remainder of the molten and/or hydrated material after partial adhesion of the absorbing and desorbing material has taken place.

In a variant of the method according to the invention, the fibrous material and the absorbing and desorbing material are introduced into the vessel after a filler body, for example in the form of a plastic casting core, has been introduced therein, which body leaves a uniform space for the fibrous material. This filler body is then removed again when the fibrous material has adhered to the wall, before or after the absorbing and desorbing material is applied.

According to an advantageous variant, one or more filler bodies are introduced between the heat-conducting projections. These filler bodies can for example be in the form of strips. The remaining space between the wall and the projections are then filled with fibrous material, preferably in a moist state, whereafter the fibrous material is dried, causing the fibrous mass to obtain a certain coherence and thus allowing the filler bodies to be removed again. Recesses then remain between the fibrous material, which recesses can accommodate a possible expansion of the fibrous material during the introduction of the absorbing and desorbing material or during the operation of the heat accumulator.

Further advantages are offered by carrying out the operations of melting and applying the sodium sulphide to the heat exchanger with the exclusion of water vapour, oxygen, carbon dioxide and any other reactive gases, so that no chemical reactions of the sodium sulphide with any of these gases can occur. As a result, the system will not produce any gases other than water during absorption and desorption, so that degassing of the installations is needed only before the first use.

The wall of the heat accumulator and of the energy system can be made of any suitable heat-conducting material, in particular of metal. By using copper or another inert material, for example coated aluminium, which in the absence of oxygen shows no reactions with sodium sulphide, a system is obtained in which the wall material also does not give rise to the evolution of gases which can make the process of vaporizing and condensing and of absorption and desorption more difficult. By this means also, degassing or the application of a vacuum during use becomes superfluous.

What is achieved by the use of the method according to the invention is that the structure of the absorbing and desorbing material, in particular sodium sulphide, no longer essentially changes after application, that is to say that the distances between the sodium ions and sulphide ions in the $Na_2S.9H_2O$ absorption form are virtually the same as those in the $Na_2S.5H_2O$ and $Na_2S.0.5H_2O$ desorption forms, with the proviso that in the latter two crystals spaces are available for water molecules. In principle, the same also applies in the case of different hydration states of other salts, and in the case of a sorbate other than water, for example methanol or ammonia.

After the absorbing and desorbing material has been applied in an adequate amount and in the desired structure, the material is dehydrated by heating and/or applying a vacuum until the maximum hydration state which is desired for the conditions of use is obtained. In the case of sodium sulphide, this is preferably approximately 5 mole per mole of $Na_2S$. The remaining free crystal lattice sites then ensure that the diffusion of the sorbate is always sufficiently high even within the lattice and even in virtually saturated state (discharged heat accumulator).

The invention also relates to an energy system which comprises a heat accumulator containing a heat-transporting substance which can be either in the liquid phase or in the vapour phase, and a vaporizer and condenser, connected via a closeable vapour line to the heat accumulator, for the vaporization or condensation of the heat-transporting substance. This type of system must first be charged by supplying heat to the accumulator and by cooling the vaporizer/condenser installation at the same time. When the system is fully or partially charged, the process can be reversed, for example by cooling the accumulator, as a result of which cooling occurs at the vaporizer/condenser installation.

The invention offers an improvement of such an energy system in that the energy system comprises a heat accumulator as described above.

In invention offers an improvement of such an energy system in that the energy system comprises a heat accumulator as described above.

In an advantageous embodiment the heat accumulator and the installation for the vaporization or condensation of the liquid or vapour respectively have a common gastight housing, the lower section of the housing being the vaporizer/condenser (the cold section) and the upper section of the housing being the heat accumulator (the hot section). With a design of this type it can be reliably ensured that a specific atmosphere is maintained in the interior of the system. This is important for good functioning of the system, since gases penetrating from the outside, such as ambient air, could disturb the processes occurring in the system.

There is preferably a connecting piece of thermally insulating material between the hot and the cold section. By this means the temperature differences which arise between the vaporizer/condenser and the heat accumulator during use of the system can be better maintained.

According to a simple embodiment, the housing is pipe-shaped. A compact design of the system possesses a housing which is provided on the inside with a partition adjoining the vaporizer/condenser at the top and having a hole which connects to one end of a line which at the other end is connected to the space between line and housing, in which space the absorbent/desorbent material is located. This embodiment has the advantage that no solid material can penetrate into the underlying vaporizer/condenser chamber.

The other end of the line is provided with a valve, which can be operated via a magnet located outside the housing. There is now no need to make through-bores in the housing for operation of the valve, so that the gastightness of the housing is ensured in this case also.

According to a second embodiment, the heat accumulator is located in a separate gastight housing which is connected via a vapour line to the top of the container. The embodiment in which the housing is pipe-shaped and has, on the inside, a concentric tube which opens into the exterior, an annular space also being present between the tubes to receive the absorbing and desorbing material and, finally, the outer tube being provided on the outside and the inner tube being provided on the inside with heat exchangers, has the advantage that an appreciable heat exchange capacity is obtained.

According to a third design variant, the heat accumulator is connected via a second vapour line to a separate condenser, which separate condenser is connected by means of a liquid line to the holder or the reservoir. The vapour escaping from the heat accumulator during charging of the system is transferred via the second vapour line to the condenser, where it condenses. The liquid is fed from the condenser to the vaporizer. In order to be able to alternately charge and discharge the system, each vapour line is connected by its own valve to the heat accumulator. When charging the system the valve in the vapour line for the condenser is open and that for the vaporizer is closed, and vice versa when discharging the system.

If each valve is a spring-loaded valve, the direction of the spring loading of which being counter to the vapour flow direction, the opening and closing of the valves can be controlled entirely automatically as a function of the pressures generated in the system.

In a fourth embodiment there are two heat accumulators which are connected in parallel to two vapour lines, one of which is connected to the condenser and the other to the vaporizer. If, with this arrangement, the heat exchangers interacting with the heat accumulators can be operated coupled together, so that alternately one heat accumulator is cooled and the other is heated, a continuous operation of the vaporizer can be obtained. In this case this installation can provide continuous cooling.

If the energy system is used at low temperature, the use of, for example, ammonia as heat-transporting substance is to be preferred. The manufacture of the vessel and of the accumulator can then take place in the same way, except that the water of crystallization is completely removed from the sodium sulphide during drying, if necessary at a temperature above 100° C., so that no further removable water of crystallization is present. The system is then filled with a sufficient amount of ammonia. Because higher pressures can arise when ammonia is used, it may be necessary to reinforce the construction of the system, for example by fitting reinforcing ribs around the cylinder.

Lower temperatures can also be achieved by adding a substance which lowers the freezing point, such as sodium chloride, to the vaporizing liquid in the vaporizer/condenser.

The heat accumulator according to the invention can be used for diverse applications. A heat accumulator containing water as heat-transporting substance can be used for the temporary storage of waste heat or of heat obtained in another way and having a temperature of, for example, 60°–140° C. This heat is fed to the solids container, by which means the heat accumulator is charged. The system can then be discharged again, heat being recovered at the same or a lower or higher temperature level. This temperature level depends in particular on the temperature at which the vaporizer section is maintained.

By cooling the solids container during discharging, for example to 20° C., cooling can be achieved at the vaporizer side at a level below the ambient temperature, for example at 0°–4° C. or lower. With a system of this type, the temperature at the vaporizer side can be controlled by controlling the temperature (or rather the degree of cooling) at the solids side as a function of the temperature at the vaporizer side.

The invention will now be illustrated in more detail with reference to the appended drawings.

FIG. 2 shows a second embodiment.

FIG. 3 shows a third embodiment.

FIG. 4 shows a further embodiment of an energy system according to the invention.

FIG. 5 shows a part of a heat accumulator according to FIG. 4

Figure 1:
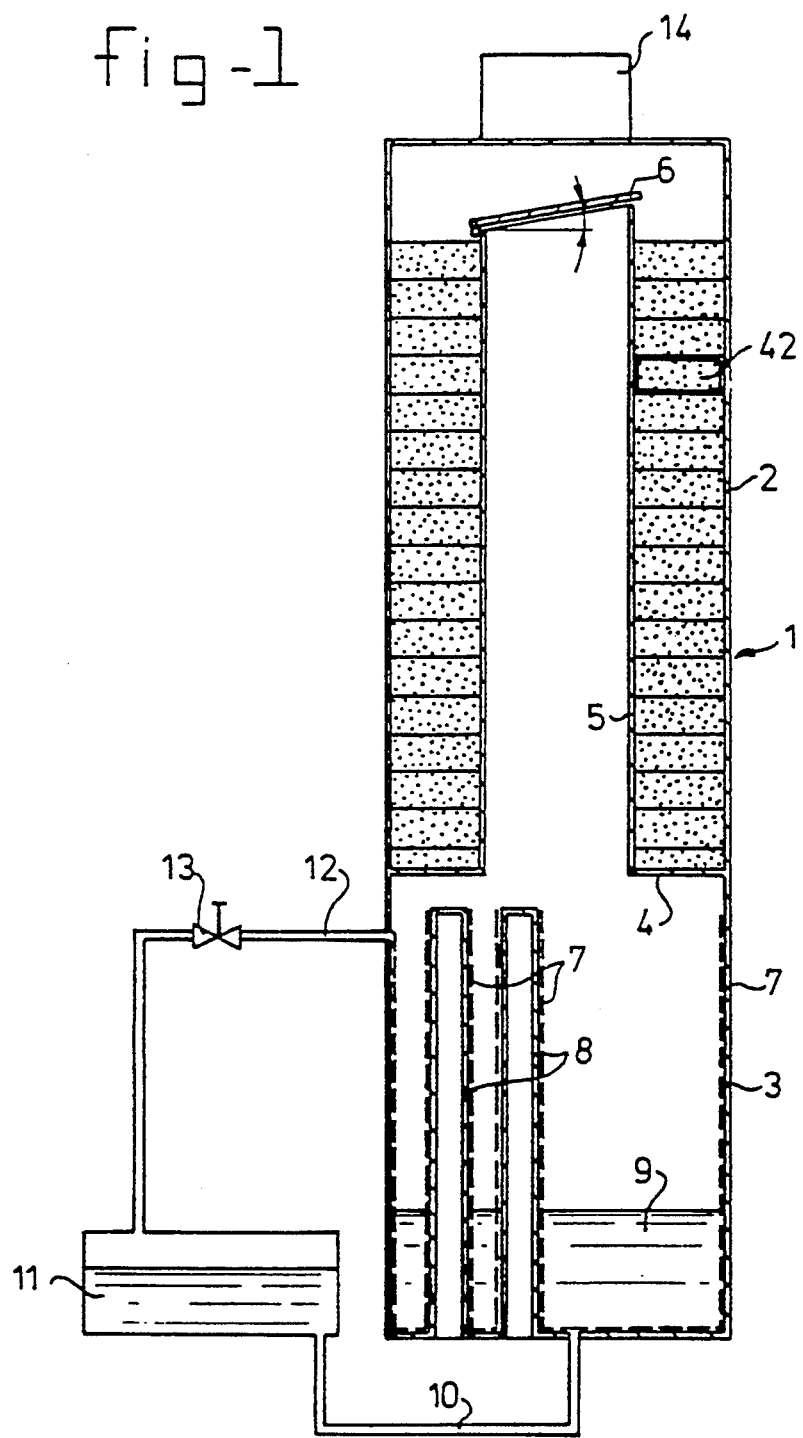
FIG. 1 shows one embodiment of an energy system provided with a heat accumulator according to the invention.

The energy system shown in FIG. 1 has a pipe-shaped housing 1, containing a container 2 for absorbing and desorbing material (heat accumulator) and a vaporizer/condenser installation containing a holder 3. Container 2 and installation 3 are separated from one another by a partition 4. The section above the partition 4 is the solids section (the "hot" side) of the energy system (the heat accumulator) and the section below the partition 4 is the vaporizer/condenser section (the "cold" side) of the energy system. An interruption of a material having a relatively poor thermal conductivity can be fitted in the tube between the hot and the cold side, so that heat transfer from the hot section to the cold section is restricted.

In container 2 there is a surface-enlarging and heat-conducting structure in the form of a rectangular winding 42 of metal wire which is fitted in the form of a spiral.

A line 5 is connected to the partition 4. Via valve 6, the line 5 offers a connection between container 2 and holder 3. Both container 2 and holder 3 are provided with known heat exchangers (not shown).

Holder 3 is provided on the inside with a capillary structure in the form of a gauze 7, fitted on the inner wall of holder 3. Holder 3 can also be provided with support elements 8, which are also covered with gauze 7. The gauze 7 extends above and below the liquid level 9. The holder can, for example, have a diameter of 150 mm and a height of 500 mm.

Holder 3 is connected via line 10 to a reservoir 11, in which liquid can also be present. By means of this reservoir 11, the fluctuations in the height of the liquid level 9 can be kept under control when using the system. This signifies that a significant portion of the gauze can always be kept above the water level, which is advantageous if the vaporization and condensation are to proceed smoothly. In order to restrict the fluctuations in height even in the case of a relatively large amount of liquid, the cross-section of the reservoir parallel to the horizontal is chosen to be as large as possible. The reservoir can, for example, be constructed as a horizontal copper tube having a diameter of 100 mm and a length of 400 mm.

By means of line 12 with valve 13, the tops of holder 3 and reservoir 11 can be connected to one another. In the charged state of the system, the reservoir can contain a large proportion of the sorbate, for example 20 to 80%.

Valve 6 can be operated by means of a magnet 14, which is located outside the housing 1. Thus, the gas-tightness of the housing 1 can be maintained. Valve 6 can optionally be positioned at an angle, in order to promote the opening by means of the magnet.

In the alternative embodiment shown in FIG. 2 the container 14 of the heat accumulator and the holder 15 of the vaporizer/condenser installation are placed alongside one another and connected by a line 16. It is true that this design is less compact, but it does have the advantage that a more intense heat exchange can be obtained with the heat accumulator. This is achieved in that a heat exchanger 17 and 18 respectively can be fitted both on the outside and on the inside of the container 14. The holder 15 is also provided with a heat exchanger 19, while it is also connected to the reservoir 20 already described.

The third embodiment shown in FIG. 3 shows an energy system in which two heat accumulators according to the invention, 21 and 22, are used. The heat accumulators 21 and 22 are connected in parallel. Via vapour line 23 they are both connected to a condenser installation 24. Via a vapour line 25 they are connected to a vaporizer/condenser installation 26. Each heat accumulator is provided with a absorbing and desorbing material 27, while the lines 23, 25 are connected by means of spring-loaded valves 28, 29 and 30, 31 respectively to the space in which the absorbing and desorbing material 27 is present.

The heat accumulators 21, 22 are both provided with heat exchangers 32, 33 having a pipe system 34 and 35 respectively. The two pipe systems 34, 35 can be connected to one another by means of four-way valves 36, 37.

In the situation shown in FIG. 3, the heat accumulator 22 is heated, that is to say it is charged, while the heat accumulator 21 is cooled, that is to say the latter is discharged. The heat liberated during cooling of heat accumulator 21 is released by a heat exchanger 41. The vapour liberated during charging of heat accumulator 22 leads to an increase in pressure in the space in which the absorbing and desorbing material is present, as a result of which valve 31 is pressed closed and valve 29 is pressed open. The vapour then flows through the vapour line 23 to condenser 24, where it condenses. The condensate 38 then flows to the reservoir 39, which, in turn, is again connected to the vaporizer/-condenser installation 26. The liquid is vaporizer again in this installation and the vapour is fed via line 25 to the heat accumulator 21. As a result of vaporization in the vaporizer/condenser installation 26 it is ensured that a specific pressure always prevails in line 25. In combination with the vacuum generated in heat accumulator 21 as a consequence of the discharging thereof, the vapour being absorbed in the absorbing and desorbing material and a reduction in pressure occurring in the space in which said material is present, valve 30 is pressed open. By this means fresh vapour can always enter into the heat accumulator 21. This continues until the heat accumulator 21 has been discharged.

The heat accumulator 21 is more or less discharged at approximately the same time as the heat accumulator 22 is charged. This signifies that no further vapour can be absorbed in the heat accumulator 21, so that the pressure in this space becomes equal to that in line 25. The spring valve 30 then closes and the spring valve 28 opens as a result of the increased pressure in the space in the heat accumulator 21 and the relatively low pressure in the vapour line 23 as a consequence of the condensation in condenser 24. During this operation the four-way valves 36, 37 are switched over, so that heat accumulator 22 is now cooled and the heat accumulator 21 is heated. During this entire process alternate heating and cooling of the heat accumulators thus occurs, while a continuous flow of vapour through the lines 23, 25 takes place. Furthermore, condensation takes place continuously in the condenser 24, while vaporization occurs continuously in the vaporizer/condenser installation 26. Heat accumulator 22 is heated with a liquid to a temperature of 95° from an external source.

The energy system shown in cross-section in FIG. 4 has a pipeshaped housing 43 which is divided into an accumulator part 46 and a vaporizer/condenser part 47 by an inner pipe 44 and an isolating partition 45. The two parts 46 and 47 are linked by means of a membrane valve 48. A spiralised heat exchanging tube 49 is contained in the accumulator part 46, the supply line 50 and the exit line 51 of the heat exchanger being fed through the wall of the vessel. Radial projections 52 are placed on the heat exchanging pipe 49. A mixture of cellulose and graphite 53, to which sodium sulphide is absorbed, is located between the projections. The vaporizer/condenser part 47 is provided with a heat exchanging casing 54 having a supply 55 and an exit 56.

FIG. 5 represents a part of the system according to FIG. 4. In FIG. 5 a cross-section of the heat exchanging tube 49 is shown. The tube 49 encloses a space 57 for the heat transfer medium. Metal projections 52 are located on the tube. During manufacture plastic strips 58 are placed between the projections 52 in longitudinal direction of the pipe, whereafter the remaining space between the projections is filled with cellulose/graphite mixture 53. After removal of the strips 53 grooves 59 remain allowing expansions of the mass 53 to be accommodated.

EXAMPLE I

On a copper tube having a diameter of 15 mm and a length of 1.2 m, radially protruding copper hairs having a length of 10 mm were soldered with a density of about 20 hairs per cm$^2$. Then about 100 g of a mixture of dry cellulose dust having a fibre length of 0.1 to 1 mm per fibril and graphite having an average particle size of 10 $\mu$m in a weight ratio of 50/50 was applied in the space between the hairs. A woven cotton cover was then applied around the tube containing the cellulose/graphite mixture in order to keep the cellulose/graphite mixture in place.

The tube provided with the cellulose/graphite mixture was then bent in a spiral shape and was placed in a cylindrical copper vessel having a diameter of 175 mm. The copper vessel had a concentric central tube with a diameter of 25 mm, whereby the space between the inner tube and the outer tube was closed with a disc at one end. This is shown in FIG. 4.

The ends of the spiral tube, which ends were free of cellulose/graphite mixture, was conducted through the vessel wall. The vessel was closed and liquid sodium sulphide (40% Na$_2$S, 60% H$_2$O) was poured into the vessel through a feed funnel. The remaining liquid was drained off from the vessel after some time; about 1000 g of sodium sulphide 40% appeared to have been absorbed to the cellulose.

The vessel was then ready for use as a heat accumulator, the spiralised tube serving as a heat exchanger, the central concentric tube, provided with a membrane valve, serving for supply and removal of water vapour, and the sodium sulphide absorbing and desorbing water vapour.

EXAMPLE II

A copper tube was provided with copper hairs in the manner described in Example I. Several plastic strips having a width of 10 mm and a thickness of 4 mm and having the same length as the copper tube were then applied between the hairs in axial direction. A 50/50 mixture of cellulose and graphite according to Example I was mixed with water into a homogeneous mass, which was subsequently applied between the hairs around the copper tube. The cellulose mass was then dried, whereby a papier-mâché-like, porous structure was obtained. The plastic strips were then removed, so that a groove free from cellulose and graphite remained. The copper tube thus coated was shaped and introduced as a heat exchanger into a copper vessel and treated with sodium sulphide as described in Example I.

Thus a heat accumulator which, as a result of a good porosity, had a satisfactory absorption and desorption of vapour was obtained.

We claim:

1. Heat accumulator consisting of a vessel having a wall which is at least partially heat-conducting, which vessel contains a material which exothermally absorbs and endothermally desorbs a heat-transporting substance, characterised in that the absorbing and desorbing material is adhered to the wall of the vessel by means of a fibrous material capable of absorbing liquids.

2. Heat accumulator according to claim 1, characterised in that the fibrous material comprises cellulose or a cellulose derivative.

3. Heat accumulator according to claim 1, characterised in that the fibrous material contains a conductive substance such as graphite or silicon carbide.

4. Heat accumulator according to claim 1, characterised in that the absorbing and desorbing material comprises sodium sulphide.

5. Heat accumulator according to claim 1, characterised in that the fibrous material is adhered to surface-enlarging, heat-conducting projections at the wall.

6. Heat accumulator according to claim 1, characterised in that the vessel comprises two mainly vertically positioned, concentric tubes, the bottom of the space between the two tubes being shut off and the inner tube serving to supply and remove the heat-transporting substance and being provided with a valve, and the fibrous material with absorbing and desorbing material thereon being present in the space between the two tubes.

7. Heat accumulator according to claim 6, characterised in that a heat exchanger to which the fibrous material is adhered, is provided in the space between the two tubes.

8. Heat accumulator according to claim 1, characterised in that the vessel is provided on the outside with a heat exchanger.

9. Process for the production of a heat accumulator having a wall which is at least partially heat-conducting, which accumulator contains a material which exothermally absorbs and endothermally desorbs a heat-transporting substance, characterised in that a fibrous material capable of absorbing liquids is applied to the inner wall of a closeable vessel and the absorbing and desorbing material being in a molten and/or hydrated state is subsequently contacted with the fibrous material.

10. Process according to claim 9, characterized in that the fibrous material is applied in a wet state and is subsequently dried.

11. Process according to claim 9, characterized in that the fibrous material is applied in a dry state.

12. Process according to claim 9, characterized in that the fibrous material comprises cellulose or a cellulose derivative.

13. Process according to claim 9, characterized in that a conductive substance such as graphite or silicon carbide is added to the fibrous material.

14. Process according to claim 9, characterised in that the absorbing and desorbing material comprises sodium sulphide.

15. Process according to claim 9, characterised in that the inner wall is provided with surface-enlarging, heat-conducting projections before the fibrous material is applied.

16. Process according to claim 15, characterised in that one or more filler bodies protruding between the projections are kept in the vessel during the application of the fibrous material.

17. Process according to claim 11, characterised in that, after the fibrous material has been applied, the fibrous material is wetted and subsequently dried.

18. Process according to claim 9, characterised in that, during the application of the absorbing and desorbing material, oxygen is excluded.

19. Energy system, comprising a heat accumulator containing a heat-transporting substance which can be either in the liquid phase or in the vapour phase, and a vaporizer and condenser, connected via a closeable vapour line to the heat accumulator, for the vaporisation or condensation of the heat-transporting substance, characterised in that the system comprises a heat accumulator according to claim 1.

20. Energy system according to claim 19, in which the heat accumulator and the vaporizer/condenser have a common gastight housing, the lower section of which is the vaporizer/condenser and the upper section of which is the heat accumulator, and in which the heat accumulator and the vaporizer/condenser are connected to one another via a connecting piece of thermally insulating material.

21. Energy system according to claim 19, in which the vaporizer and the condenser are separate and are each connected via a closeable vapour line to the heat accumulator and are mutually connected via a liquid line.

22. Energy system according to claim 21, in which the heat accumulator having closeable vapour lines is designed as a double system for continuous use.

23. Energy system according to claim 19, in which the heat-transporting substance is water, methanol or ammonia.

* * * * *